July 23, 1946.  J. M. HAIT  2,404,488
AMPHIBIAN PROPULSION MECHANISM
Filed Jan. 8, 1942
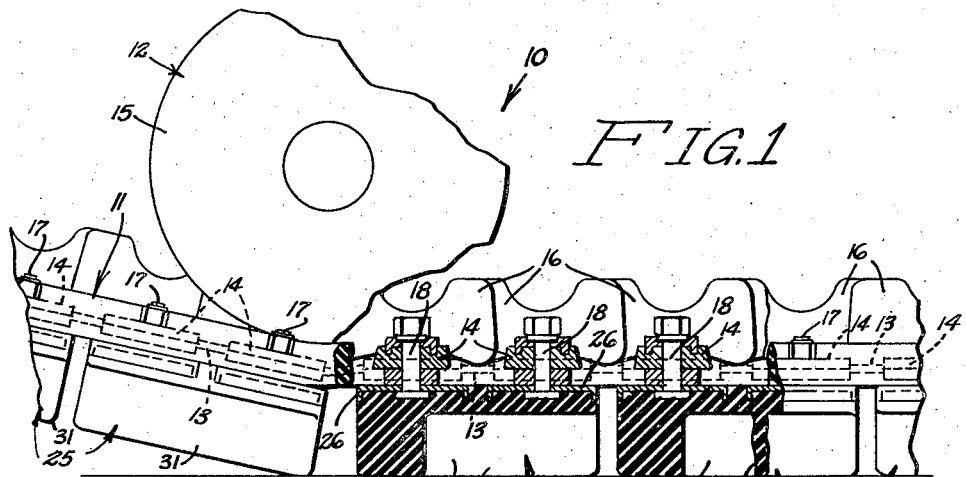
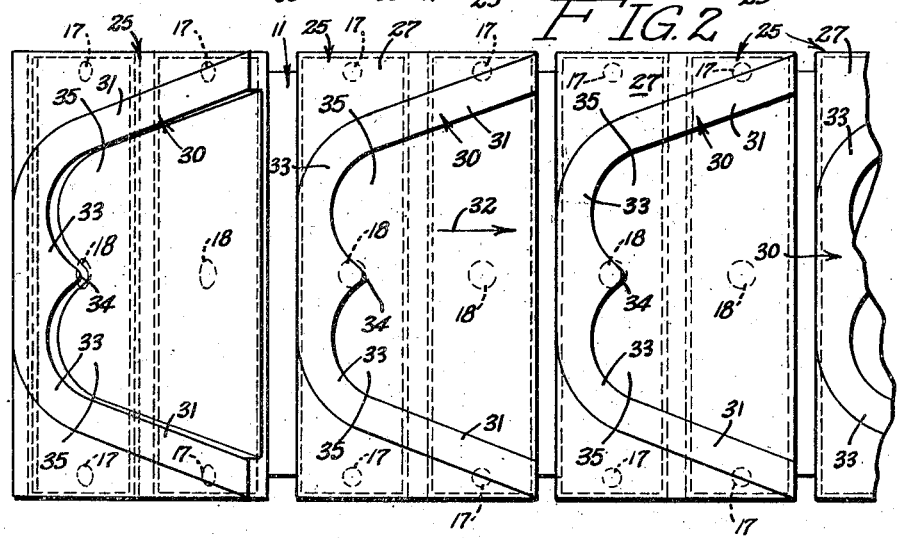
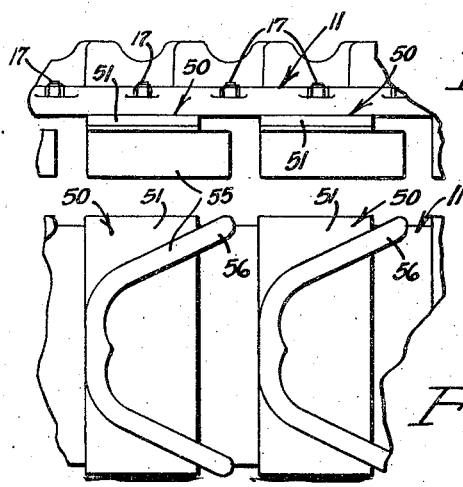
INVENTOR:
JAMES M. HAIT
BY 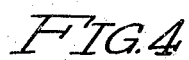
ATTORNEY Patented July 23, 1946

2,404,488

UNITED STATES PATENT OFFICE 2,404,488

AMPHIBIAN PROPULSION MECHANISM

James M. Hait, San Gabriel, Calif., assignor to Food Machinery Corporation, San Jose, Calif., a corporation of Delaware Application January 8, 1942, Serial No. 426,029

4 Claims. (Cl. 115—1)

This invention relates to amphibian craft and particularly to track-laying devices for propelling the same both on water and on land.

It is common practice to employ for the propulsion of such craft track-laying devices which are similar to those employed for propelling tractors and military tanks. These devices include endless track-forming belts or chains which will be hereinafter referred to generically by use of the term "belt."

In modern warfare the usefulness of amphibian craft would be greatly enhanced if these craft could be operated at high speeds on land.

Heretofore however it has been assumed to be necessary to equip the traction belts of these craft with metal blades or grousers to serve as impellers when the craft is traveling in the water and these blades were not suitable to allow the craft to travel at high speeds on land and particularly on hard-surfaced roads.

It is an object of my invention to provide a propulsive mechanism of the track-laying type for an amphibian craft which will provide an adequate propulsive thrust when the craft is operated in the water and at the same time will be suitable for supporting the craft when the latter is operating on land at relatively high speeds without the mechanism incurring any substantial damage due to this land travel.

In my laboratory experiments I have determined that to attain the maximum efficiency in impeller action each of said grousers must be relatively long in the direction in which these move with said belts. This renders it difficult to mount the most efficient type of grouser on the track-laying belts as the latter must make relatively short radius turns in passing around the idle and driving sprockets with which the belt is associated.

It is another object of the invention therefore to provide such a propulsion mechanism which will permit the use of grousers of high efficiency and yet will facilitate these grousers readily passing around turns of short radii, thus adapting these grousers for use on track-forming belts.

Further objects and advantages will be made manifest in the following description taken in connection with the accompanying drawing in which:

Fig. 1 is a side elevational view of a preferred embodiment of the invention with portions thereof broken away as indicated by the line 1—1 in Fig. 2 to illustrate its construction.

Fig. 2 is a bottom plan view of Fig. 1.

Fig. 3 is a side elevational view of a modified form of the invention.

Fig. 4 is a bottom plan view of Fig. 3.

Referring specifically to the drawing, the propulsion mechanism 10 includes an endless belt 11 and a set of bogie wheels 12 provided on the amphibian equipped with this mechanism.

The belt 11 is preferably formed of rubber and steel and includes endless steel cables 13 and an endless series of steel clamps 14 which are clamped on the cables 13, these cables and clamps both being imbedded in the rubber of the belt 11. The bogie wheels 12 are formed so that each bogie wheel provides a pair of rollers 15, the belt 11 having articulating guide members 16 which extend upwardly between the rollers 15 of the bogie wheels 12 to hold the belt 11 in alignment with the bogie wheels.

Clamps 14 are held together and to the bogie wheel guides 16 by bolts 17 and 18. The bolts 17 and 18 also serve to rigidly attach to the belt 11 an endless series of grousers 25. Each of these grousers includes a pair of base plates 26 preferably having downward flanged edges and bodies 27 of rubber which are bonded to these plates. Each of the plates 26 is attached to the belt 11 by a set of two bolts 17 and a center bolt 18 of one of the clamps 14. The two plates 26 of a given grouser 25 therefore are capable of articulation relative to each other when the belt 11 passes around a turning axis. The rubber of the grouser bodies 27 is of sufficiently resilient character to accommodate itself to this articulation of the base plates 26 on which this rubber body is mounted. In this manner a much longer grouser may be mounted on the belt 11 to function as a unit in engaging the water when the amphibian is afloat than would otherwise be practicable. This is of great consequence in that grousers of maximum efficiency necessarily must be relatively long in the direction in which they travel on the belt 11.

The rubber block 27 is shown as molded to embody an impeller blade 30 which not only incorporates a highly efficient form for attacking the water but is of sufficient thickness to constitute an adequate cushion support for the belt 11 and the amphibian with which this is equipped when the latter is traveling on land. It is to be noted that the blade 30 is symmetrical on opposite sides of the longitudinal axis of the belt 11, the impeller on each side of this axis including a relatively long substantially straight blade portion 31 which is inclined outwardly in the direction of its travel, the latter being indicated by the arrow 32, and connects at its inner end with a sharply curved portion 33 which terminates at a sharp central edge 34, the impeller blade 30 forming a cup 35 on each side of the longitudinal axis of the belt.

While I regard the blade 30 to be a superior type of grouser blade, from the standpoint of its hydro-dynamic efficiency, and because the reaction forces produced by its travel through the water are balanced on opposite sides of the axis of the belt so as to produce no side thrust, I do not wish the present invention to be limited to the use of such a particular form of grouser blade.

The present invention particularly relates to the use of resilient means for forming a grouser so that one portion of this may articulate relative to another when the grouser passes around a turning axis thereby permitting a relatively long and efficient type of grouser blade to be incorporated with the belt.

It is believed clear that an amphibian equipped with my invention would not only be able to travel at relatively high speeds on land and hard-surfaced roads and yet realize relatively high efficiency in propulsive thrust from the track-forming belts when traveling through water.

Referring now to Figs. 3 and 4, I have here shown a belt 11 equipped with grousers 50 each of which is formed on a single base 51 which is secured to alternate sets of bolts 17 and 18 of the belt 11. The grouser 50 has a rubber impeller blade 55 provided thereon, the full length of which is obtained by extending end portions 56 of these blades beyond the borders of the base 51. As the grouser blades 55 are preferably formed entirely of rubber, the end portion 56 thereof will yield readily from any object encountered thereby and is not depended upon for any substantial contribution toward supporting the amphibian equipped with these grousers when the amphibian is traveling on land. In the water however the grousers 55 are adapted to operate with relatively high efficiency owing to their form.

While reference has been made herein to the grousers of my invention being formed of rubber, this term as used in the claims is to be understood as generic in scope and as embracing not only what is technically known as rubber, but all suitable substitutes therefor or equivalents thereof.

What I claim is:

1. In an amphibian propulsion mechanism, the combination of: an endless traction belt; means for mounting said belt on said amphibian and driving the same; an endless series of grousers secured to said belt, each of said grousers comprising a body of rubber and a plurality of attaching means for attaching said grouser to said belt, said attaching means being adapted to have articulating relation with each other when said belt travels around a turning axis.

2. In an amphibian propulsion mechanism, the combination of: an endless traction belt; means for mounting said belt on said amphibian and driving the same; an endless series of grousers, a substantial portion of each of which is formed of a resilient material; and means for securing said grouser to said belt at points spaced in the direction of travel of said grouser on said belt, the portions of said grouser at said points of attachment being adapted to have flexing or articulating relation with each other when said belt rotates about a turning axis.

3. In an amphibian propulsion mechanism, the combination of: an endless traction belt; means for mounting said belt on said amphibian and driving the same; an endless series of grousers provided on said belt, each of said grousers having a base secured to said belt and an impeller blade formed thereon, said impeller blade including a central cup-forming portion and outer blade portions diverging symmetrically on opposite sides of the axis of said belt, the tip portions of said blades being formed of rubber.

4. In an amphibian propulsion mechanism, the combination of: an endless traction belt; means for mounting said belt on said amphibian and driving the same; an endless series of grousers provided on said belt, each of said grousers having a base secured to said belt and an impeller blade formed therein, said impeller blade including a central cup-forming portion and outer blade portions diverging symmetrically on opposite sides of the axis of said belt, the tip portions of said blades being formed of rubber, and extending beyond the border line of said base.

JAMES M. HAIT.